United States Patent
Hassner et al.

(10) Patent No.: US 7,080,200 B2
(45) Date of Patent: Jul. 18, 2006

(54) SYSTEM AND METHOD FOR HANDLING WRITES IN HDD USING 4K BLOCK SIZES

(75) Inventors: Martin Aureliano Hassner, Mountain View, CA (US); Richard M. H. New, San Jose, CA (US); Spencer W. Ng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 355 days.

(21) Appl. No.: 10/640,915

(22) Filed: Aug. 14, 2003

(65) Prior Publication Data
US 2005/0036381 A1    Feb. 17, 2005

(51) Int. Cl.
G06F 11/08    (2006.01)
(52) U.S. Cl. .......................................... 711/114; 714/6
(58) Field of Classification Search ...................... None
See application file for complete search history.

(56) References Cited

U.S. PATENT DOCUMENTS 5,394,534 A * 2/1995 Kulakowski et al. ....... 711/112
5,813,025 A * 9/1998 Murphy et al. ............. 711/114
2003/0147167 A1 8/2003 Asano et al. .................. 360/53

FOREIGN PATENT DOCUMENTS

EP    1280063 A2    1/2003

* cited by examiner

Primary Examiner—Donald Sparks
Assistant Examiner—Jared Rutz
(74) Attorney, Agent, or Firm—John L. Rogitz (57) ABSTRACT

In a disk drive that uses large block sizes (e.g., 4 KB) for storing data and that responds to read and write requests from a client that uses small block sizes (e.g., 512 bytes), at least the starting and ending 4K blocks of read data are cached. Since much disk data that is the subject of a write request is first read, upon a subsequent write request the drive controller determines whether the starting and ending blocks are in cache and if so, writes new data to those blocks, calculates a full ECC for them, and then calculates ECC for intervening blocks and writes new data to the intervening blocks. If both starting and ending blocks are not in cache the drive controller executes either a high data integrity routine or a high performance routine as chosen by the user.

10 Claims, 6 Drawing Sheets

Handling of Write Request

Fig. 4
Handling of
Read Request

Fig. 5
Handling of Write Request

Fig. 6
Cluster Not In Cache

Fig. 7
Data Not In Cache - High Data Integrity

Fig. 8
Data Not In Cache - High Performance

Fig. 9
Basic Data Scrub Loop

SYSTEM AND METHOD FOR HANDLING WRITES IN HDD USING 4K BLOCK SIZES

FIELD OF THE INVENTION

The present invention relates generally to hard disk drives (HDD), particularly although not exclusively to hard disk drives in redundant arrays of independent disks (RAID) systems.

BACKGROUND OF THE INVENTION

Since the introduction of fixed block hard disk architecture more than twenty years ago, the standard size of a disk block, or data sector, has remained unchanged, typically at 512 bytes with some special application drives at 520 and 528. As the recording density of disk drives continues to increase, the amount of physical space that a sector occupies continues to shrink as a consequence. However, as understood by the present invention the size of physical defects on the magnetic media, such as scratches and contaminants, does not shrink in similar proportion, if at all. As a result, the present invention understands that when defects occur within a sector, a greater fraction of its data becomes corrupted as compared to older, less dense drives.

To combat this effect, a more powerful error correction code (ECC) method is required. However, a more powerful ECC requires more redundancy, which means an increasing percentage of a disk's storage space is required for ECC rather than storing user data. As understood herein, to avoid this decrease in data formatting efficiency, the more powerful ECC can be applied to a larger block size so as to amortize the increased redundancy over a larger number of bytes. Furthermore, regardless of how powerful an ECC is, a substantial portion of a data block must be error free for correction to work. The greater the number of bytes a defect spans, the larger the data block must be. For these reasons, the present invention recognizes that the standard block size should be increased to, e.g., four kilobytes (4 KB). It is to be understood that while 4 KB is used for discussion here, the present invention is not limited to such block size.

One way to effect this change would be to change the current industry standard interface of 512 bytes to 4 KB. Unfortunately, this would require widespread changes to operating system software and BIOS firmware.

Another way to effect the change is to make disk drives that internally implement a 4 KB ECC block size. Externally, the interface can remain at today's 512 byte block size, with the drives emulating the 512 byte block size interface. The present invention recognizes that such an emulation can be straightforward and simple. More particularly, on a read command the drive simply reads those native 4 KB blocks containing the requested 512 byte blocks, and then returns the requested data to the host. On a write command, if the write data happens to be some multiple of 4 KB and the data happens to be aligned at a native 4 KB block boundary, then ECC can be simply generated for the new data and written to the disk. However, as understood herein if either of these two conditions are not met, then the beginning and/or the end of the new data lies partially within a native 4 KB block of the HDD, in which case the drive must first read the leading 4 KB block and/or the trailing 4 KB block, insert the new data into the block(s), generate ECC for the modified block(s), and write all the new blocks to the disk. Such a read-modify-write procedure, requiring, as it does, an extra drive revolution, reduces drive performance.

With more particularity, there are two methods for implementing 4 KB ECC block in a HDD. The first method is to increase the native sector size from 512 bytes to 4 KB, with the sector ECC for the 4 KB sector enhanced over that for the 512 byte sector. To a host that still uses a 512 byte sector interface, such a 4 KB sector is logically eight 512 byte logical sectors. A 4 KB block of this method is referred to herein as a "native 4 KB block". A second method is to retain the native sector size of 512 bytes, and apply increasing levels of ECC to increasing numbers of aggregates of such sectors. An example would be to call the sector ECC associated with each native 512 byte sector the first level ECC; a second level and more powerful ECC would be computed for and added to a group of 4 consecutive sectors; yet a third level and even more powerful ECC would be computed for and added to a group of eight consecutive sectors. Such a multilevel ECC method, using any number of levels and any number of sectors per level, is called the "Integrated Sector Format" (ISF). A group of eight consecutive 512 byte ISF sectors would form a 4 KB ECC block (associated with the third level ECC in the example given). Such a 4 KB block is referred to herein as an "ISF 4 KB block".

As recognized by the present invention, even though it is possible to access the native 512 byte sectors individually, an ISF block must be updated as a whole in order to properly maintain the full multilevel of ECCs. The invention disclosed herein is applicable to both of the above-mention types of 4 KB ECC blocks, with some of the present features applicable to ISF 4 KB block only. In the following, a "block" means either native 4 KB block or ISF 4 KB block, unless specified otherwise.

SUMMARY OF THE INVENTION

The present invention critically recognizes that a piece of data frequently is first read before it is written. This occurs when a record is updated or a user file (text, drawing, presentation, picture, video clip, etc.) is edited. Additionally, in RAID applications where the redundancy is computed over multiple drives (e.g. RAID 4, 5 and 6), writing to one of the drives always entails the RAID controller reading the old data from that drive and the old parity from the parity drive before the new data and new parity are written.

With this recognition in mind, a hard disk drive (HDD) includes at least one storage disk, a data cache, and a drive controller accessing the disk and cache. The drive controller implements logic to store at least some data on the disk in blocks having a first size (e.g., 4 KB) in response to at least one write request received from a system that uses blocks having a second size (e.g., 512 bytes) smaller than the first size. The logic of the drive includes receiving a request to write data, and identifying at least a starting block and an ending block on the disk that are associated with the starting address and the ending address of the write data. The starting and ending blocks have the first block size. The write data only partially fills the starting and ending blocks.

Next, the logic determines whether at least the starting and ending blocks are present in the cache. If the starting and ending blocks are present in the cache, the logic includes writing new data associated with the request into at least one of the starting and ending blocks in cache to render at least one modified block, and then generating an error correction code (ECC) for the modified block. New data that is associated with the request is written into blocks between the starting and ending blocks.

In a preferred embodiment, if the starting and ending blocks are present in the cache, the logic executed by the drive controller further includes generating an ECC for each block between the starting block and the ending block. The starting and ending blocks preferably are saved in cache pursuant to a read of the version of the data on the disk.

For drives using ISF, if the starting and/or ending ISF blocks are not present in the cache, the drive controller can execute a high data integrity routine or a high performance routine to fulfill the request to write data. For HDDs using native 4 KB blocks, if the starting and/or ending blocks are not present in the cache, the high data integrity routine is always executed; there is no option for high performance routine. The high data integrity routine executed by the drive controller can include copying the starting block and ending block from disk to the cache, writing new data associated with the request into at least one of the starting and ending blocks in cache to render at least one modified block, and then generating an error correction code (ECC) for the modified block. An ECC for each block between the starting block and the ending block is also generated. New data and new ECC that is associated with the request are written to disk from the starting block to the ending block.

In contrast, the high performance routine executed by the drive controller for ISF HDDs can include determining whether the starting ISF block or the ending ISF block is present in the cache, and when one is present in the cache, new data is written to the ISF block in cache and then a full multilevel ECC is generated for the ISF block. For each starting and ending ISF block not present in the cache, only a first level ECC is generated for the new sectors of that block.

In another aspect, a hard disk drive controller accesses a cache and at least one storage disk on which data is stored in blocks having a first size, with the drive controller receiving input/output requests from a requestor using blocks having second size smaller than the first size. The controller includes means for receiving a read request for requested data on the disk. The requested data partially occupies a starting block and partially occupies an ending block. Means are provided for copying the starting block and the ending block in their entireties to the cache. The controller also has means for receiving a write request to write new data to the disk, with the new data being associated with the requested data. Means are provided to write new data into the starting and ending blocks to render at least one modified block when the starting block and ending block are identified to be in the cache. The controller also has means for generating an error correction code (ECC) for the modified block, and means for writing new data associated with the request into blocks between the starting and ending blocks.

In yet another aspect, a hard disk drive controller accesses a cache and at least one disk containing data in blocks having a first size, with the controller responding to read requests and write requests from a client implementing blocks having a second size smaller than the first size. The disk drive controller executes logic that includes storing, in their entireties, a starting block and an ending block in cache pursuant to a read request for data that only partially fills the starting and ending blocks. For subsequent write requests requiring the data, the controller determines whether the starting block and ending block are in cache and if so, the controller writes new data associated with a write request into the starting and ending blocks to render a modified block, for which a full error correction code (ECC) is generated.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
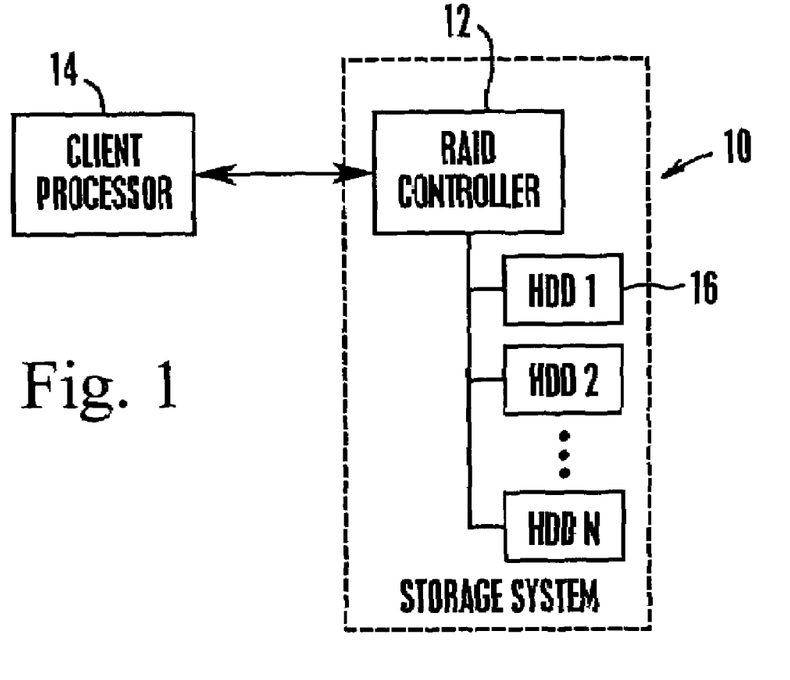
FIG. 1 is a block diagram of a HDD of the present invention in one intended environment.
Figure 2:
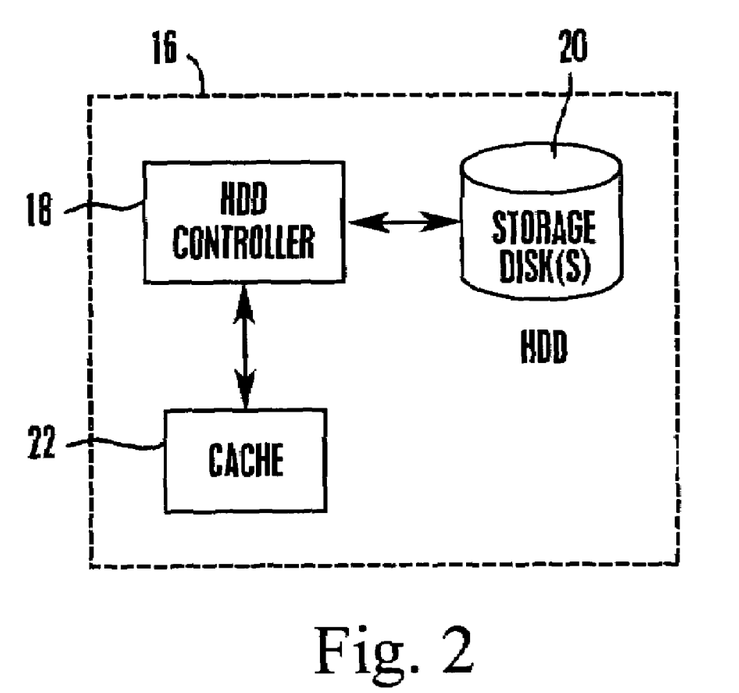
FIG. 2 is a block diagram of the HDD.

Referring initially to FIG. 1, a RAID system is shown, generally designated 10, that includes a RAID controller 12 which communicates with one or more client processors 14 to store and retrieve data on plural hard disk drives 16 using a relatively small block size, e.g., 512 bytes. FIG. 2 shows that a hard disk drive 16 of the present invention includes a drive controller 18 that reads and writes data onto one or more data storage disks 20 in response to requests from the RAID controller 12 using a relatively large block size, e.g., four thousand bytes (4 KB). Each HDD 16 may also include a solid state data cache 22 as shown in accordance with HDD principles known in the art. In the preferred non-limiting embodiment, the portion of the drive controller 18 that executes the logic herein is the internal drive control electronics, not the external host bus adapter control electronics.

Figure 3:
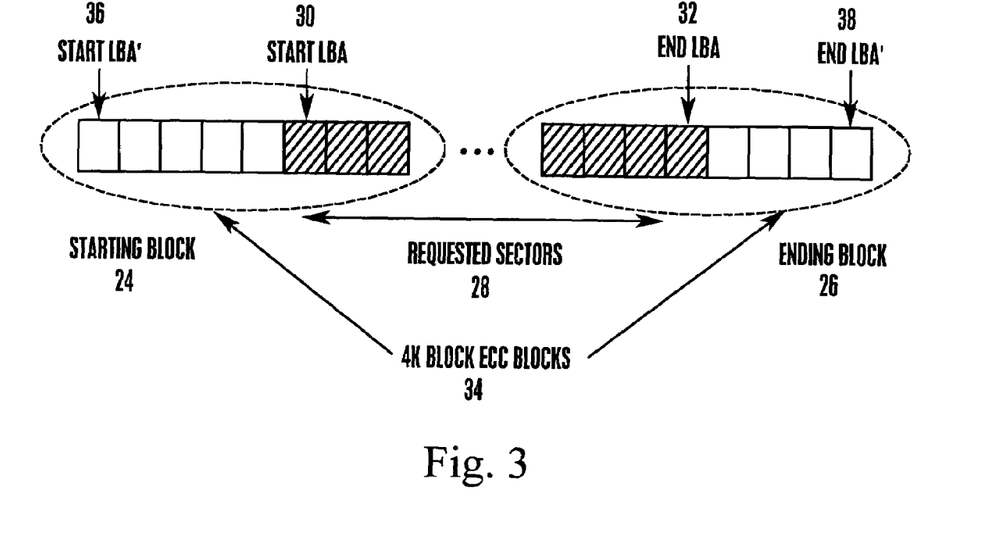
FIG. 3 is a schematic diagram showing the logical block addresses (LBA) of requested data.

FIG. 3 shows the starting and ending 4 KB blocks 24, 26 and requested contiguous sectors 28 which span between the starting and ending blocks 24, 26. In most cases, the data (which is associated with so-called logical block addresses ("LBA") of 512 byte sectors) that is the subject of a read request or write request only partially fills the starting and ending blocks 24, 26 as shown by the cross-hatched areas of FIG. 3 with the address of the requested starting sector labelled "Start LBA" 30 and the address of the requested ending sector labelled "End LBA" 32, and it is in these cases that the present invention finds particular effectiveness. For small requests such as one or two 512 byte sectors, the starting block 24 and ending block 26 may be the same block.

In any case, the sizes of the HDD internal blocks 24, 26 are relatively large, e.g., 4 KB as indicated at 34 in FIG. 3, compared to the sizes of the HDD-host interface blocks (e.g., 512 bytes) used by a client or user such as the RAID controller 12 shown in FIG. 1. As shown in FIG. 3, the starting block 24 has a start address 36, denoted "Start LBA'" in FIG. 3, while the ending block 26 has an end address 38, denoted "End LBA'" in FIG. 3. That is, in the preferred embodiment the Start LBA 30 resides in a preferably 4 KB block of, e.g., eight 512 byte sectors with a Start LBA' 36, and the End LBA 32 resides in a 4 KB block of eight sectors with an End LBA' 38.

Figure 4:
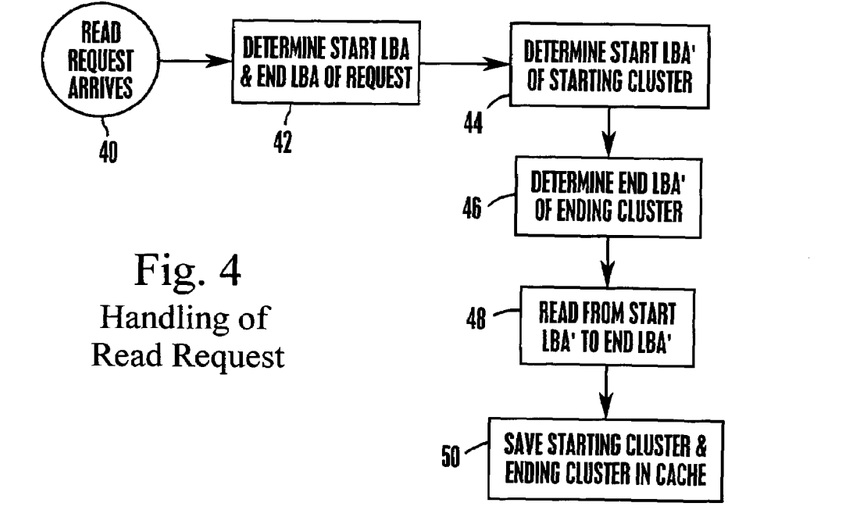
FIG. 4 is a flow chart showing the logic for executing a read request.

FIG. 4 shows the logic of the drive controller 18 for executing a read request, it being recognized herein that data that is to be the subject of a write request often is read first in accordance with disclosure above. Commencing at state 40 a read request arrives at the HDD. The drive controller 18 determines the Start LBA 30 and End LBA 32 of the read request at block 42. Next, in block 44, it determines the Start LBA' 36 of the starting block 24 that contains the Start LBA 30, followed by block 46 where it determines the End LBA' 38 of the ending block 26 that contains the End LBA 32. The logic then proceeds to block 48, in which the drive controller 18 reads from disk all the 512 byte sectors between the Start LBA' 36 and the End LBA' 38, inclusive. At block 50, the drive controller 18 stores in the cache 22, at a minimum, the entire starting block 24 and the entire ending block 26. Blocks between the starting block 24 and the ending block 26 may also be saved in the cache 22 by the drive controller 18 if desired.

For ISF drives, the above logic must be taken deliberately by the controller 18 since it is possible to read individual 512 byte blocks. For drives using other ECC schemes where the native block size is truly 4 KB, the above logic occurs naturally since the drive 16 cannot read smaller than 4 KB. If the size of the requested data is small, when the controller would normally cache the read request data, the entire read request rounded up to include the starting and ending blocks can be stored in cache. In contrast, if the size of the requested data is large, wherein the controller 18 would normally not cache the read request data, only the starting and ending blocks 24, 26 need be cached.

Figure 5:
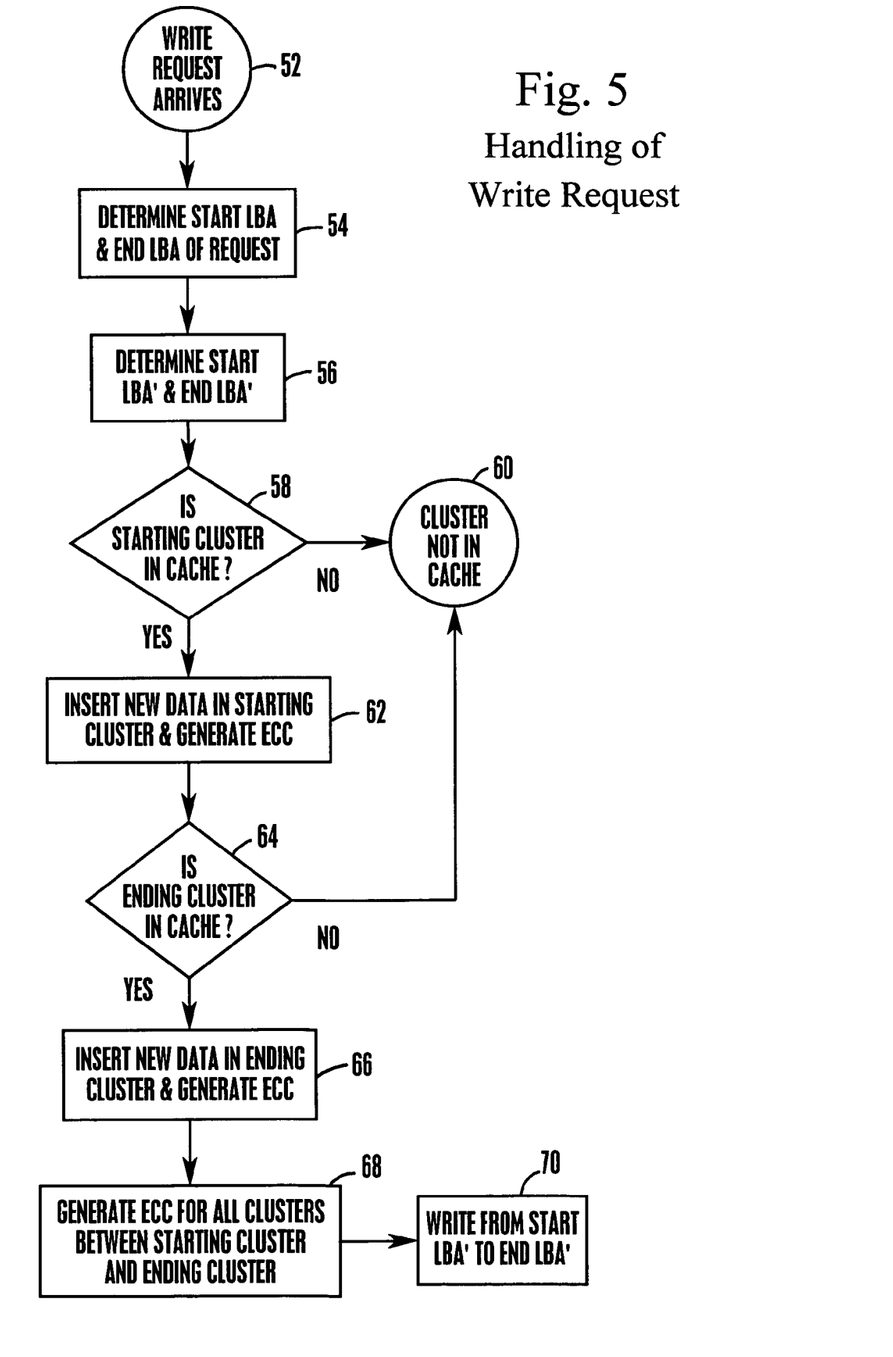
FIG. 5 is a flow chart showing the logic for executing a write request.

FIG. 5 shows the logic of the drive controller 18 for executing a write request. Commencing at state 52 a write request arrives at the drive controller 18. The drive controller 18 determines the Start LBA 30 and End LBA 32 of the data that is subject to the write request at block 54. Next, in block 56, the logic determines the Start LBA' 36 of the starting block 24 and the End LBA' 38 of the ending block 26.

Proceeding to decision diamond 58, it is determined whether the entire starting block 24 can be found in the cache 22. If not, the logic ends at state 60, indicating that the sought-after block is not in the cache 22, for further processing as described below in reference to FIG. 6. Otherwise, the logic proceeds to block 62 to insert the starting sectors of the write request into the starting block 24 that is in the cache 22, replacing the corresponding original sectors. Then, new, preferably full ECCs are generated for the modified starting block in accordance with ECC principles known in the art.

Proceeding to decision diamond 64, the drive controller 18 next determines whether the entire ending block 26 can be found in the cache 22. If not, the logic ends at state 60, but otherwise the logic flows to block 66 wherein the ending sectors of the write request are inserted into the ending block 26 in the cache 22, replacing the corresponding original sectors. New, preferably full ECCs are generated for the modified ending block.

From block 66 the logic moves to block 68, wherein the logic of the drive controller 18 generates the full ECCs for all the blocks of new data between the starting block 24 and the ending block 26. Preferably after the step at block 68, at block 70 all sectors from the Start LBA' 36 to the End LBA' 38, inclusive, together with all the new ECCs, are written out to the disk 20.

The above described write method incurs very little overhead, and yet will save the drive from having to do read (from disk)-modify-write for write requests when those write requests are preceded by a read request for the same address, as would be the case for RAIDs and many typical user applications.

Figure 6:
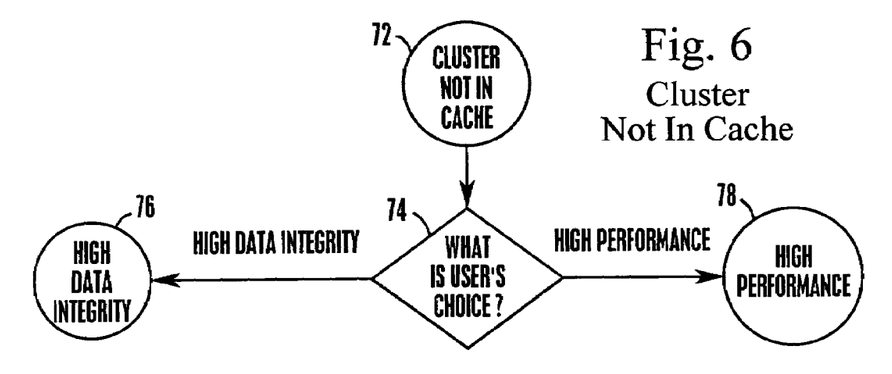
FIG. 6 is a flow chart showing the logic for determining which of FIGS. 7 and 8 to use when the requested write data is not in cache.

Now referring to FIG. 6, when state 60 in FIG. 5 is arrived at (either one or both of the starting and ending blocks 24, 26 are not found in the cache 22 to generate full ECC for the write data), the logic commences at state 72 and moves to decision diamond 74 wherein it is determined whether the user has selected high data integrity or high performance. The high performance option is available only for ISF drives and not available for native 4 KB block drives. This choice can be made when the drive controller 18 is first installed by the user, or the drive controller 18 may have a default setting. If high data integrity was selected, the drive controller 18 proceeds to state 76 to execute the logic of FIG. 7; otherwise, for a high performance selection the controller 18 moves to state 78 to execute the logic of FIGS. 8 and 9.

Figure 7:
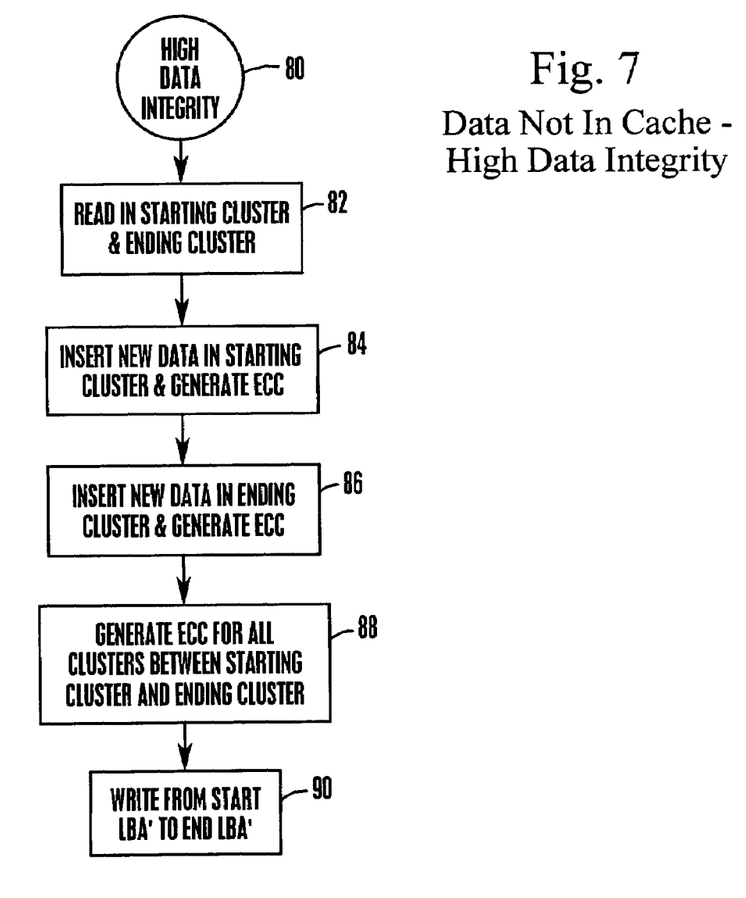
FIG. 7 is a flow chart showing the logic for executing a write request on non-cached data while maintaining high data integrity.

The high data integrity logic of FIG. 7 commences at state 80 and proceeds to block 82 to read from disk the missing starting and/or ending blocks into the cache 22. Moving to block 84 the drive controller 18 modifies the starting block by inserting the starting sectors of the write request into the starting block in cache, replacing the corresponding original sectors, and new ECCs are generated for the modified starting block. In block 86 the drive controller 18 modifies the ending block by inserting the ending sectors of the write request into the ending block in cache, replacing the corresponding original sectors, and new ECCs are generated for the modified ending block. The drive controller 18 then moves to block 88 where it generates the ECCs for all the blocks of new data between the starting block and the ending block. Lastly, in block 90, all sectors from the Start LBA' to the End LBA', inclusive, together with all the new ECCs, are written out to disk.

In the above high data integrity logic, a read-modify-write is performed, thus incurring a performance penalty but preserving the data reliability feature of the 4 KB ECC.

Figure 8:
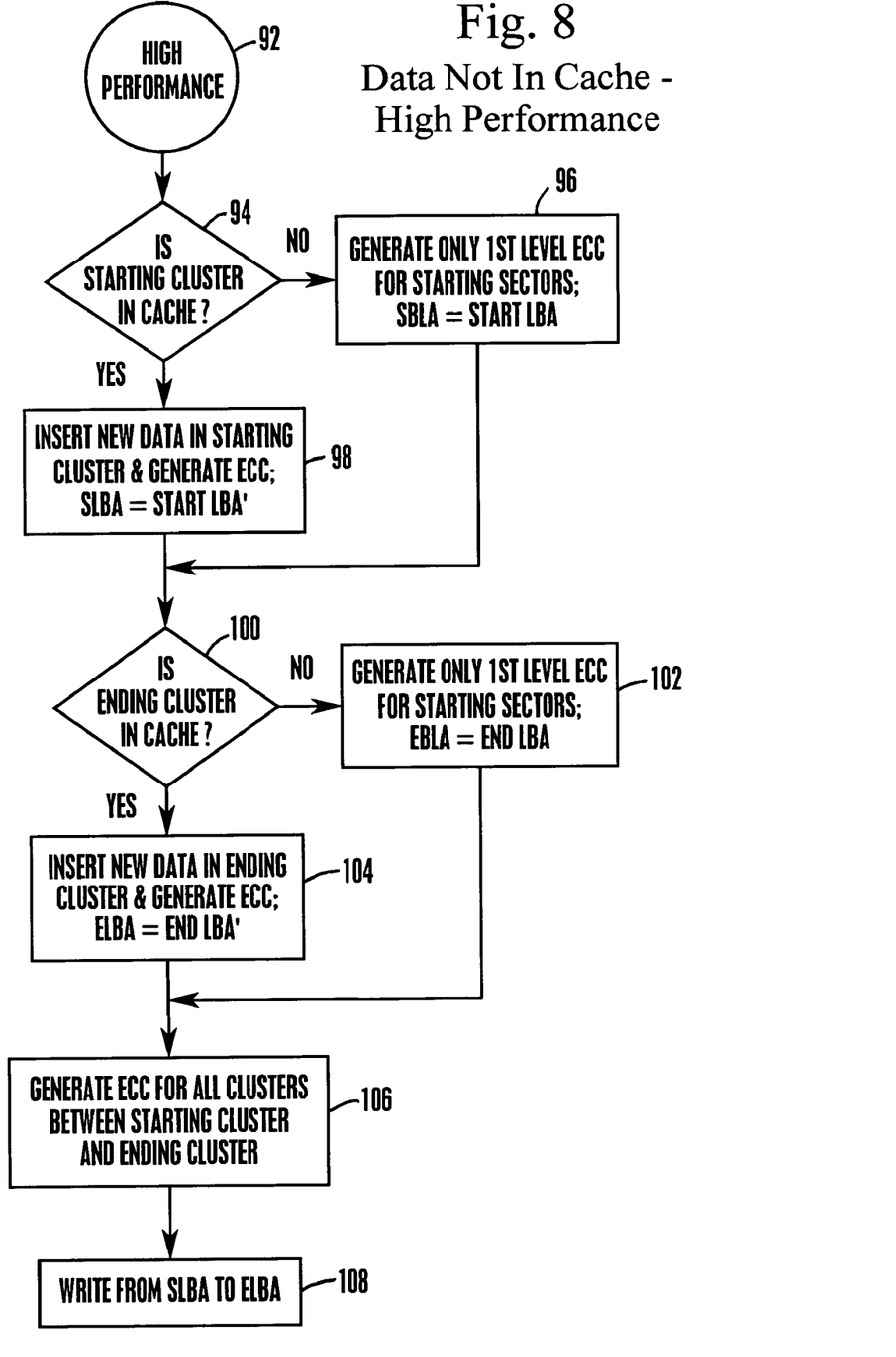
FIG. 8 is a flow chart showing the logic for executing a write request on non-cached data while maintaining high performance.

In contrast, the high performance logic of FIG. 8, available only for ISF drives, commences at state 92 and proceeds to decision diamond 94 to determine whether the entire starting ISF block 24 associated with the data to be written can be found in the cache 22. If not, the logic moves to block 96 to generate only a first level ECC for the new sectors of the starting ISF block in accordance with ECC level principles known in the art. No full ECC is generated for the starting ISF block because not all the necessary sectors are available in the cache 22. Additionally, at block 96 a holder variable "SLBA" is set to the Start LBA 30.

When the entire starting ISF block 24 that is associated with the data to be written can be found in the cache 22, the logic moves from decision diamond 94 to block 98, wherein the starting sectors of the write request are inserted into the starting ISF block 24 that is in the cache 22, replacing the corresponding original sectors. Full (all levels) new ECCs are also generated for the modified starting ISF block. Additionally in block 98 SLBA is set to Start LBA' 36.

From block 96 or 98 the logic moves to decision diamond 100 to determine whether the entire ending ISF block 26 associated with the data to be written can be found in the cache 22. If not, the logic moves to block 102 to generate only a first level ECC for the new sectors of the ending ISF block. Additionally, at block 102 a holder variable "ELBA" is set to the End LBA 32.

When the entire ending ISF block 26 can be found in the cache 22, the logic moves from decision diamond 100 to block 104, wherein the ending sectors of the write request are inserted into the ending ISF block 26 that is in the cache 22, replacing the corresponding original sectors. Full (all levels) new ECCs are also generated for the modified ending ISF block. Additionally in block 104 ELBA is set to End LBA' 38.

Proceeding to block 106, the drive controller 18 generates the full multilevel ECCs for all the ISF blocks of new data between the starting block and the ending block. Lastly, in block 108, all sectors from SLBA to ELBA, inclusive, are written out to disk.

Because not all blocks have their full multilevel ECCs generated when the high performance option of FIG. 8 is selected, an autonomous background process preferably is used to scrub the disk to look for such blocks and update their ECCs during idle times in the drive controller 18. The entire drive 16 storage space is logically partitioned into many small data scrub units. These units can be fixed size or variable size. For efficiency, a scrub unit should preferably be at least 512 sectors. A preferred embodiment uses physical tracks as the units for data scrubbing. This way, zero-latency read techniques (i.e. start reading as soon as the head is on track) can be easily applied when doing a scrub read so that rotational latency overhead is eliminated. A bit map corresponding to these scrub data units can be used to keep track of which unit has already been scrubbed, but any other method can also be used. At the start of each scrub cycle the bit map is reset.

Figure 9:
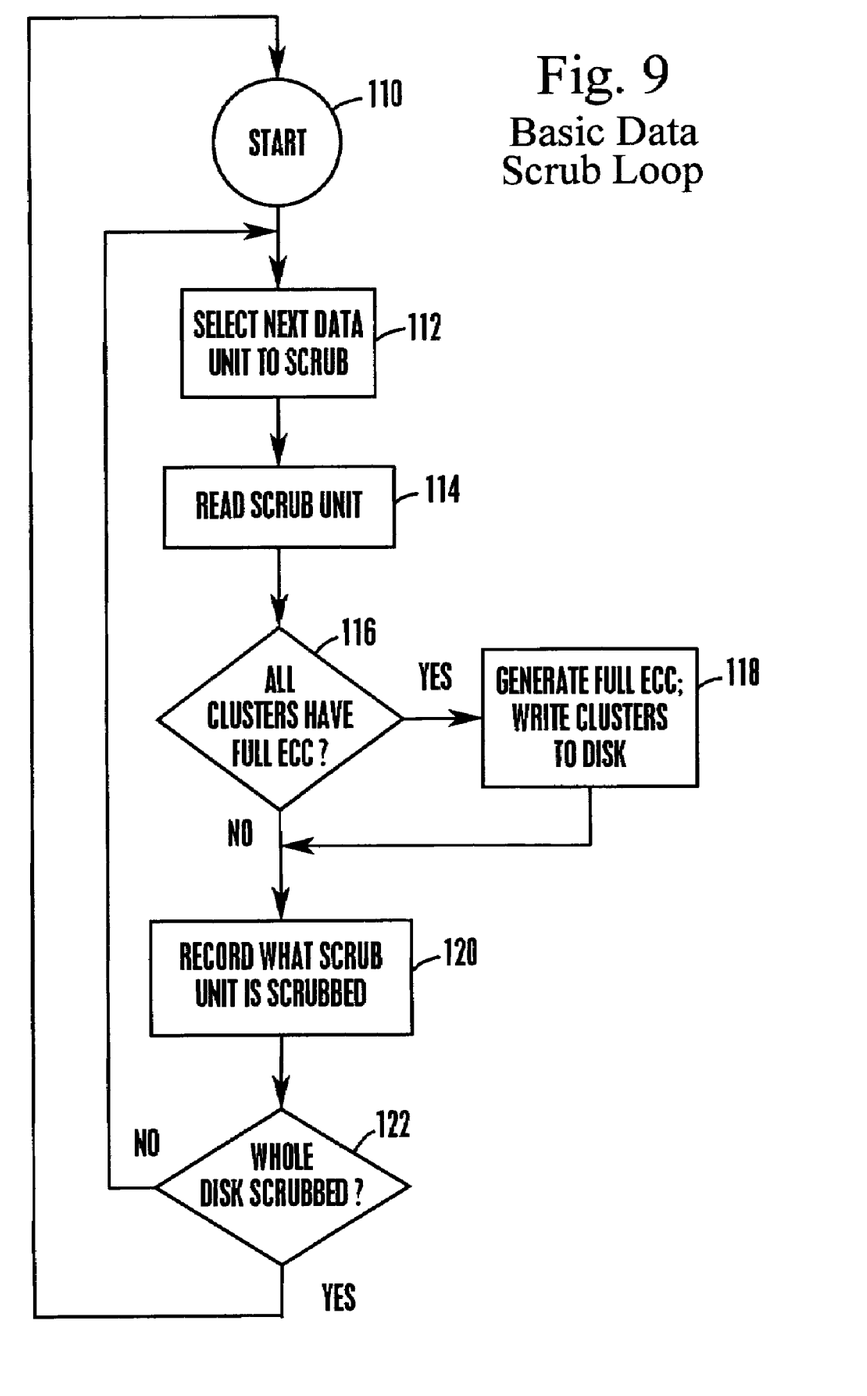
FIG. 9 is a flow chart showing the logic of the basic data scrubbing loop.

The basic scrub loop is shown in FIG. 9. Commencing at state 110 the logic moves to block 112 wherein the next data unit to be scrubbed is selected and then read by the drive controller 18 in block 114. At decision diamond 116 it is determined whether any ISF blocks with out-of-date ECC are encountered, and if so, new multilevel ECCs are generated for these sectors in block 118. Those blocks with their new multilevel ECC are written out to disk. At block 120 the drive controller 18 updates its list (or bit map) of which data units have been scrubbed. At block 122 the drive controller 18 determines whether the entire disk 20 has already been scrubbed, and if not, the logic loops back to block 112. If the entire disk has been scrubbed, the logic loops back to block 110 to start a new scrub cycle.

In the case of ISF drives for the high performance logic shown in FIG. 8, since individual 512 byte sectors can be read and written, the drive can proceed to write only the updated sectors, generating the first level ECC but not updating the second and third levels of ECC. Such partial updating of ECC would not incur any performance penalty since read-modify-write is not carried out, although the data reliability feature of the 4 KB ECC temporarily would be forfeited for these blocks. Miscorrection detection due to partially updated ECC/CRC checks is guaranteed. Later, a background scrub process can scan the disk and fully update those blocks whose ECCs had not been properly updated, thus restoring the full data reliability feature for such blocks.

It may now be appreciated that the present invention is embodied within the HDD. The host to which the HDD is attached does not know that the HDD is employing large block ECC and therefore does not need to be modified in any way. In other words, the host may continue to operate using today's standard interface.

While the particular SYSTEM AND METHOD FOR HANDLING WRITES IN DRIVE CONTROLLER USING 4K BLOCK SIZES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A hard disk drive (HDD) comprising:
   At least one storage disk;
   At least one data cache; and
   A drive controller accessing the disk and cache, the drive controller implementing logic to store at least some data on the disk in blocks having a first size in response to at least one write request received from a system using blocks having a second size smaller than the first size, the logic including:
      receiving at least one request to write data;
      identifying at least a starting block, and an ending block, associated with a version of the data on the disk, the starting and ending blocks having the first size, portions of the version of the data on the disk only partially filling the starting and ending blocks;
      determining whether at least the starting and ending blocks are present in the cache; and
      if the starting and ending blocks are present in the cache:
         writing new data associated with the request into at least one of the starting or ending blocks at least in cache to render at least one modified block;
         generating an error correction code (ECC) for the modified block;
         writing new data associated with the request at least into blocks between the starting and ending blocks, wherein if the starting and ending blocks are not present in the cache, the drive controller executes at least one of: a high data integrity routine, or a high performance routine, to fulfill the request to write data, and further wherein the drive controller is an ISF drive controller and the high performance routine executed by the ISF drive includes:
            determining whether at least one of: the starting block, or the ending block, is present in the cache;

for each starting and/or ending ISF block present in the cache, writing new data to the block and then generating full multilevel ECC for the block; and for each starting and/or ending ISF block not present in the cache, generating only a first level ECC for the block.

2. The HDD of claim 1, wherein if the starting and ending blocks are present in the cache, the logic executed by the drive controller further includes generating an ECC for all blocks between the starting block and the ending block.

3. The HDD of claim 1, wherein the starting and ending blocks arc saved in cache pursuant to a read of the version of the data on the disk.

4. The HDD of claim 1, wherein the high data integrity routine executed by the drive controller includes:

copying the starting block and ending block from disk to the cache;

writing new data associated with the request into at least one of the starting or ending blocks in cache to render at least one modified block;

generating an error correction code (ECC) for the modified block;

generating an ECC for all blocks between the starting block and the ending block; and writing new data associated with the request at least into blocks between the starting and ending blocks.

5. A hard disk drive controller accessing at least one cache and at least one storage disk on which data is stored in blocks having a first size, the drive controller receiving input/output requests from a requestor using blocks having second sizes smaller than the first size, comprising:

means for receiving at least one read request for requested data on the disk, the requested data partially occupying a starting block and partially occupying an ending block;

means for copying at least the starting block and the ending block in their entireties to the cache;

means for receiving a write request to write new data to the disk, the new data being associated with the requested data;

means for, if the starting block and ending block are identified to be in the cache, writing at least some new data into at least one of the starting or ending blocks to render at least one modified block;

means for generating an error correction code (ECC) for the modified block;

means for writing new data associated with the request at least into blocks between the starting and ending blocks;

means for, if the starting and ending blocks are not present in the cache, executing at least one of: a high data integrity routine, or a high performance routine, to fulfill the request to write data, wherein the means for executing the high performance routine include:

means for determining whether at least one of: the starting block, the starting block being a starting ISF block, or the ending block, the ending block being an ending ISF block, is present in the cache;

means for, for each starting or ending ISF block present in the cache, writing new data to the block and then generating full multilevel ECC for the ISF block; and means for, for each starting or ending ISF block not present in the cache, generating only a first level ECC for the ISF block.

6. The hard disk drive controller of claim 5, further comprising means for, if the starting and ending blocks are present in the cache, generating an ECC for all blocks between the starting block and the ending block.

7. The hard disk drive controller of claim 5, wherein the means for executing the high data integrity routine include:

means for copying from disk at lease one of: the starring block, or ending block, to the cache;

means for writing new data associated with the request into at least one of the starting or ending blocks in cache to render at least one modified block;

means for generating an error correction code (ECC) for the modified block;

means for generating an ECC for all blocks between the starting block and the ending block; and means for writing new data associated with the request at least into blocks between the starting and ending blocks.

8. A hard disk drive controller accessing at least one data cache and at least one disk containing data in blocks having a first size, the controller responding to read requests and write requests from a client implementing blocks having a second size smaller than the first size, the disk drive controller executing logic including:

storing in their entireties at least a starting block and an ending block in cache pursuant to a read request for data that only partially fills the starting and ending blocks;

for subsequent write requests requiring at least some of the data, determining whether the starting block and ending block are in cache and if so, writing new data associated with a write request into at least one of the starting or ending blocks to render at least one modified block, and then generating a full error correction code (ECC) for the modified block, wherein if the starting and ending blocks are not present in the cache, the controller executes at least one of: a high data integrity routine, or a high performance routine, to fulfill the request to write data, wherein the high performance routine executed by the drive controller includes:

determining whether at least one of: a starting ISF block, or an ending ISF block, is present in the cache;

for each starting and ending ISF block present in the cache, writing new data to the block and then generating full multilevel ECC for the ISF block; and for each starting and ending ISF block not present in the cache, generating only a first level ECC for the ISF block.

9. The controller of claim 8, further comprising writing new data associated with a write request at least into blocks between the starting and ending blocks, and generating an ECC for all blocks between the starting block and the ending block.

10. The controller of claim 8, wherein the high data integrity routine executed by the drive controller includes:

copying from disk the starting block and ending block to the cache;

writing new data associated with the write request into at least one of the starting or ending blocks in cache to render at least one modified block;

generating an error correction code (ECC) for the modified block;

generating an ECC for all blocks between the starting block and the ending block; and writing new data associated with the request at least into blocks between the starting and ending blocks.

* * * * *